(12) United States Patent
Hikita et al.

(10) Patent No.: US 8,187,796 B2
(45) Date of Patent: May 29, 2012

(54) METHOD OF MANUFACTURING OPTICAL WAVEGUIDE DEVICE

(75) Inventors: Takami Hikita, Ibaraki (JP); Junichi Fujisawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 204 days.

(21) Appl. No.: 12/834,253

(22) Filed: Jul. 12, 2010

(65) Prior Publication Data
US 2011/0014575 A1 Jan. 20, 2011

(30) Foreign Application Priority Data

Jul. 17, 2009 (JP) ................................ 2009-169336
Apr. 27, 2010 (JP) ................................ 2010-102277

(51) Int. Cl.
*G02B 6/13* (2006.01)
(52) U.S. Cl. ........................ 430/321; 430/330
(58) Field of Classification Search .................. None
See application file for complete search history.

(56) References Cited

U.S. PATENT DOCUMENTS

| 7,330,612 | B2 | 2/2008 | Nakashiba et al. |
|---|---|---|---|
| 7,400,809 | B2 | 7/2008 | Erben et al. |
| 2002/0021879 | A1 | 2/2002 | Lee et al. |
| 2005/0018988 | A1* | 1/2005 | Shih et al. ................ 385/129 |
| 2007/0189661 | A1 | 8/2007 | Nakashiba et al. |
| 2008/0107881 | A1 | 5/2008 | Nakashiba et al. |
| 2008/0113168 | A1 | 5/2008 | Nakashiba et al. |
| 2009/0286187 | A1 | 11/2009 | Hodono et al. |
| 2009/0305170 | A1* | 12/2009 | Shimizu ........................ 430/321 |
| 2010/0067849 | A1 | 3/2010 | Hikita et al. |
| 2010/0068653 | A1 | 3/2010 | Fujisawa et al. |
| 2010/0092893 | A1 | 4/2010 | Fujisawa et al. |

FOREIGN PATENT DOCUMENTS

| JP | 2004-341454 A | 12/2004 |
|---|---|---|
| JP | 2009-276724 A | 11/2009 |
| JP | 2010-66667 A | 3/2010 |
| JP | 2010-72314 A | 4/2010 |
| JP | 2010-117380 A | 5/2010 |
| WO | 2006/062781 A1 | 6/2006 |

OTHER PUBLICATIONS

European Search Report dated Nov. 25, 2010, issued in corresponding European Patent Application No. 10169946.6.

* cited by examiner

*Primary Examiner* — John A. McPherson
(74) *Attorney, Agent, or Firm* — Westerman, Hattori, Daniels & Adrian, LLP (57) ABSTRACT

An optical waveguide device is provided which is capable of reducing light propagation losses in the cores of an optical waveguide when the optical waveguide is formed on a surface of a substrate, regardless of the type of substrate. A photosensitive resin layer (4A) for over cladding layer formation is made of a photosensitive resin composition of a non-solvent type, and is heated prior to the exposure thereof to light. This causes interface portions between the cores (3) and the photosensitive resin layer (4A) to be formed into mixed layers (5). This reduces light propagation losses.

10 Claims, 6 Drawing Sheets

PRIOR ART

FIG. 6B

PRIOR ART

FIG. 6C

PRIOR ART

FIG. 6D

PRIOR ART

FIG. 7A

PRIOR ART

FIG. 7B

PRIOR ART

FIG. 8

PRIOR ART

FIG. 9

PRIOR ART

METHOD OF MANUFACTURING OPTICAL WAVEGUIDE DEVICE

BACKGROUND OF THE INVENTION

1. Field of the Invention

The present invention relates to a method of manufacturing an optical waveguide device for widespread use in optical communications, optical information processing and other general optics.

2. Description of the Related Art

In general, an optical waveguide for an optical waveguide device is constructed in such a manner that cores serving as a passageway for light are formed in a predetermined pattern on a surface of an under cladding layer, and that an over cladding layer is formed so as to cover the cores. Such an optical waveguide is typically formed on a surface of a substrate such as a metal substrate and the like, and is manufactured together with the substrate to provide an optical waveguide device.

Figure 6A:
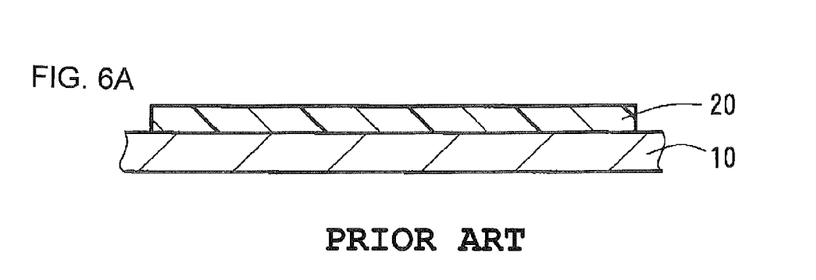
FIGS. 6A to 6D are illustrations schematically showing a conventional method of manufacturing an optical waveguide device.
Figure 6B:
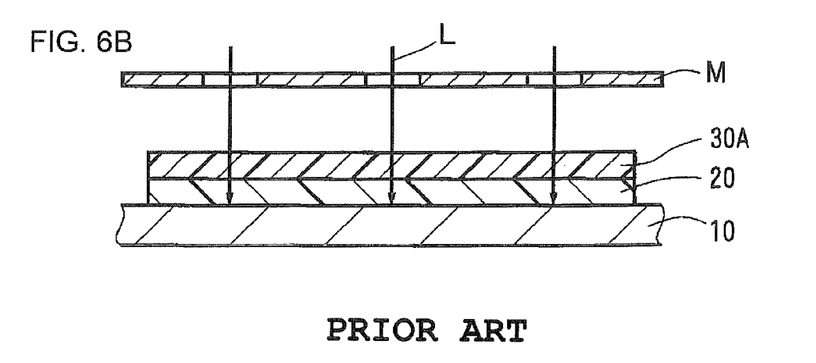
Figure 6C:
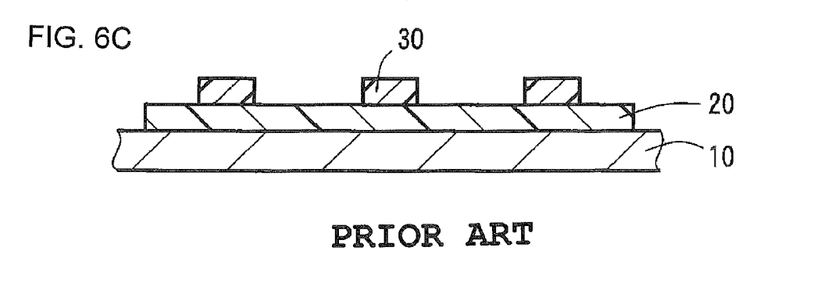
Figure 6D:
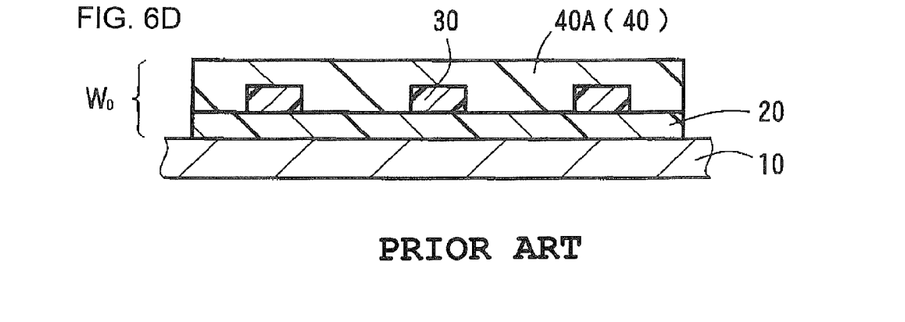

A conventional method of manufacturing such an optical waveguide device is as follows. First, as shown in FIG. 6A, an under cladding layer 20 is formed on a surface of a substrate 10. Then, as shown in FIG. 6B, a photosensitive resin for the formation of cores is applied to a surface of the under cladding layer 20 to form a photosensitive resin layer 30A. Next, irradiation light L is directed through a photomask M formed with an opening pattern corresponding to the pattern of cores 30 (with reference to FIG. 6C) toward the photosensitive resin layer 30A. The irradiation light L is caused to reach the photosensitive resin layer 30A through openings of the opening pattern, thereby exposing portions of the photosensitive resin layer 30A thereto. The irradiation light L is directed to the photosensitive resin layer 30A at right angles thereto. A photoreaction proceeds in the portions of the photosensitive resin layer 30A exposed to the irradiation light L so that the exposed portions are hardened. Then, development is performed using a developing solution to dissolve away unexposed portions of the photosensitive resin layer 30A, as shown in FIG. 6C. The remaining exposed portions become the cores 30 formed in a predetermined pattern. The cores 30 are typically rectangular in sectional configuration. Thereafter, as shown in FIG. 6D, a photosensitive resin for the formation of an over cladding layer is applied to the surface of the under cladding layer 20 so as to cover the cores 30, to thereby form a photosensitive resin layer 40A. Next, irradiation light is directed toward the photosensitive resin layer 40A to expose the photosensitive resin layer 40A thereto. This causes the photosensitive resin layer 40A to be formed into an over cladding layer 40. In this manner, an optical waveguide $W_0$ is formed on the surface of the substrate 10, for example, as disclosed in Japanese Published Patent Application No. 2004-341454.

Figure 7A:
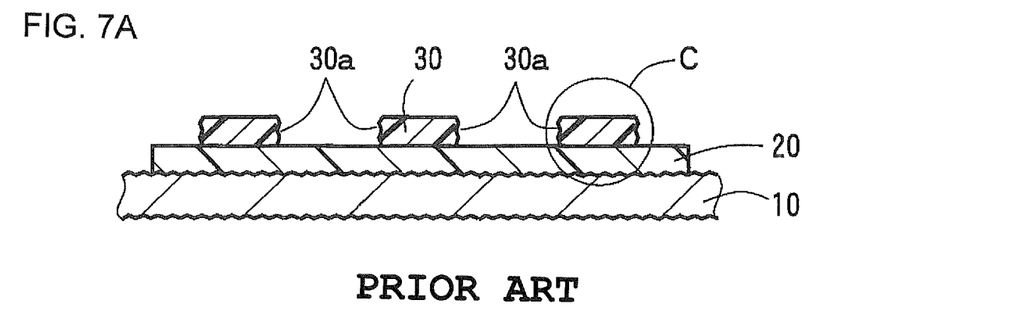
FIG. 7A is a sectional view schematically showing the formation of cores in the conventional manufacturing method.
Figure 7B:
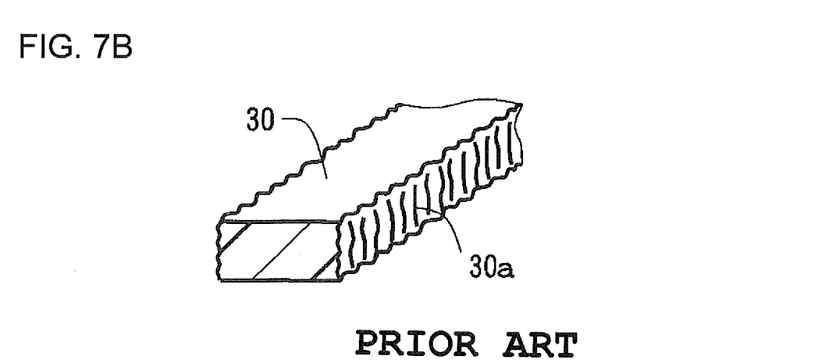
FIG. 7B is a view drawn based on an electron micrograph of a core enclosed with the circle C of FIG. 7A.

In such a conventional method, however, the cores 30 have side surfaces 30a formed as roughened surfaces in some cases, as shown in FIGS. 7A and 7B. Such cores 30 increase the propagation losses of light propagating inside the cores 30 because of leakage of light from the side surfaces 30a formed as the roughened surfaces or other reasons. There is apprehension that the above-mentioned optical waveguide does not function as optical interconnection. When the surface roughening of the side surfaces 30a of the cores 30 is even slight but is greater than the wavelength of the light propagating inside the cores 30, the surface roughening causes scattering losses. Also in this case, the propagation losses increase, and there is apprehension that the above-mentioned optical waveguide does not function as optical interconnection, as described above. FIG. 7B is a view drawn based on a photograph in perspective of a core 30 enclosed with the circle C of FIG. 7A which is magnified 700 times with an electron microscope. By magnifying the core 30 700 times with the electron microscope in this manner, it can be seen that the side surfaces 30a of the cores 30 are formed as the roughened surfaces.

Figure 8:
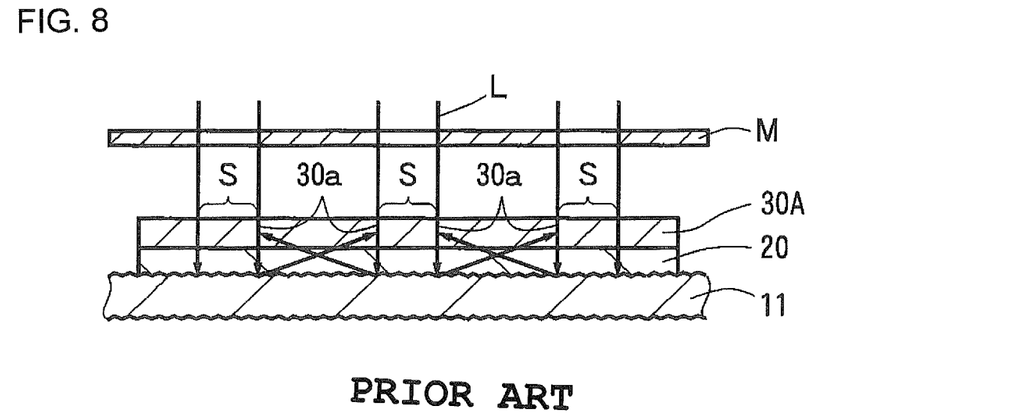
FIGS. 8 and 9 are illustrations schematically showing respective situations in the step of forming the cores in the conventional manufacturing method.

The present inventors have made studies to diagnose the cause of the formation of the side surfaces 30a of the cores 30 as the roughened surfaces. In the course of the studies, the present inventors have found that the surface roughening of the side surfaces 30a of the cores 30 occurs either in the case (1) where a metal substrate 11 (with reference to FIG. 8) in common use which is made of stainless steel (SUS) foil and the like is used as the substrate 10 (with reference to FIGS. 6A to 6D) or in the case (2) where a substrate (PET substrate) 12 (with reference to FIG. 9) made of a material having polyethylene terephthalate (PET) as a main component is used as the substrate 10.

As a result of further studies on the case (1) where the metal substrate 11 made of stainless steel foil and the like is used, the present inventors have found that the metal substrate 11 made of stainless steel foil and the like includes a roughened surface having an arithmetic mean roughness (Ra) of not less than 0.095 μm. For this reason, in the above-mentioned step of forming the cores 30, the irradiation light L for use in the exposure which passes through the openings of the photomask M is transmitted through the photosensitive resin layer 30A for the core formation and the under cladding layer 20, and thereafter is reflected diffusely from the roughened surface of the metal substrate 11 because of the surface roughening, as indicated by arrows shown in FIG. 8. The diffusely reflected irradiation light L is transmitted through the under cladding layer 20 obliquely upwardly from below. Then, boundary surfaces (surfaces that are to become the side surfaces 30a) for the patterning of the cores 30 are exposed to the diffusely reflected irradiation light L directed obliquely from below, as indicated by the arrows, in future core regions S included in the photosensitive resin layer 30A for the core formation. This exposure to the light directed obliquely from below results from the above-mentioned diffuse reflection, and is uneven. Thus, it has been found that an unwanted photoreaction proceeds unevenly at the surfaces that are to become the side surfaces 30a of the cores 30 because of the exposure to the light directed obliquely from below to result in the increased width of the cores 30 and the formation of the side surfaces 30a of the cores 30 as the roughened surfaces. In other words, the surfaces that are to become the side surfaces 30a of the cores 30 have both portions subjected to a low degree of exposure to light and portions subjected to a high degree of exposure to light because of the diffuse reflection of the irradiation light L. In the subsequent step of development, the portions subjected to a low degree of exposure to light are dissolved away from the surfaces that are to become the side surfaces 30a of the cores 30, and the portions subjected to a high degree of exposure to light remain unremoved. Thus, the side surfaces 30a of the cores 30 are formed as the roughened surfaces.

Figure 9:
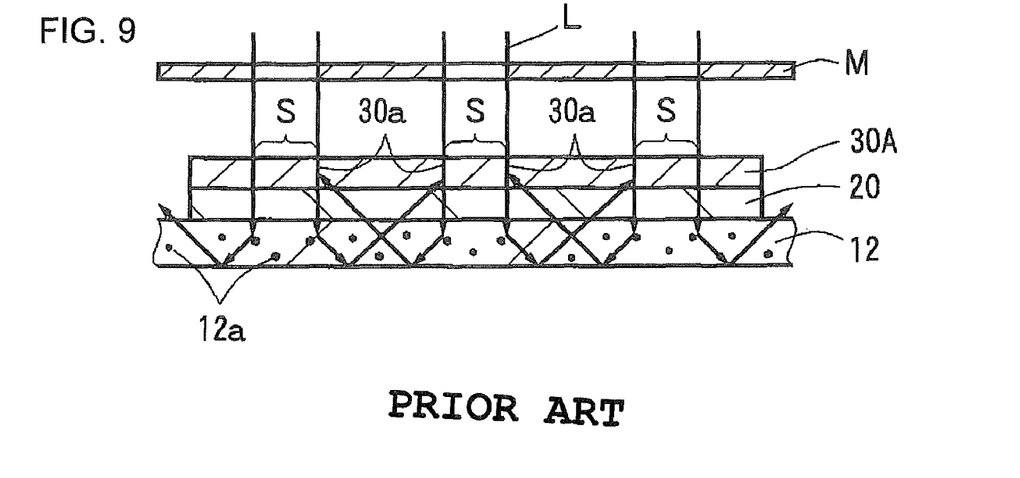

The present inventors have made further studies on the case (2) where the PET substrate 12 is used. As a result of the further studies, it has been found that the PET substrate 12 contains an additive component such as a lubricant material 12a and the like, as shown in FIG. 9, and that the irradiation light L for use in the exposure in the above-mentioned step of forming the cores 30 impinges upon and is reflected from the additive component such as the lubricant material 12a, to thereby follow irregular paths. It has also been found that most of the irradiation light L reaches the bottom surface (the back surface) of the PET substrate 12. That is, in the above-mentioned step of forming the cores 30, the irradiation light L for use in the exposure which passes through the openings of the photomask M is transmitted through the photosensitive resin layer 30A for the core formation and the under cladding layer 20, and thereafter enters the interior of the PET substrate 12, as shown in FIG. 9. In the PET substrate 12, the irradiation light L impinges upon the lubricant material 12a and the like to follow irregular paths, and then reaches the bottom surface of the PET substrate 12 at an angle. In general, the back surface of the PET substrate 12 is in contact with a mounting surface of a mounting table and the like (not shown) for placing the PET substrate 12 thereon, the mounting surface being impervious to the irradiation light L. For this reason, the irradiation light L reaching the bottom surface of the PET substrate 12 does not exit from the back surface of the PET substrate 12 but is reflected from the bottom surface of the PET substrate 12 obliquely upwardly as indicated by arrows in FIG. 9. Thereafter, the reflected irradiation light L impinges upon the lubricant material 12a and the like in the PET substrate 12 to follow further irregular paths, and then exits from the front surface of the PET substrate 12 obliquely upwardly. The irradiation light L exiting obliquely upwardly is transmitted through the under cladding layer 20 obliquely upwardly from below. Then, the boundary surfaces (the surfaces that are to become the side surfaces 30a) for the patterning of the cores 30 are exposed to the irradiation light L directed obliquely from below in the future core regions S included in the photosensitive resin layer 30A for the core formation. This exposure to the light directed obliquely from below comes from the diffuse reflection resulting from the lubricant material 12a and the like contained in the PET substrate 12 as mentioned earlier, and is uneven. Thus, as in the case (1) where the metal substrate 11 made of stainless steel foil and the like is used, an unwanted photoreaction proceeds unevenly at the surfaces that are to become the side surfaces 30a of the cores 30 because of the exposure to the light directed obliquely from below to result in the formation of the side surfaces 30a of the cores 30 as the roughened surfaces.

The assignee of the present application has proposed a method of manufacturing an optical waveguide device which is capable of suppressing the surface roughening of core side surfaces of an optical waveguide when the optical waveguide is formed on a surface of a substrate, and has already applied for patents (Japanese Patent Applications Nos. 2008-130727, 2008-234735, 2008-239346, and 2008-269688).

Japanese Patent Application No. 2008-130727 discloses a technique for forming an under cladding layer containing an irradiation light absorbing agent on a roughened surface of a metal substrate or forming an irradiation light absorbing layer on the roughened surface of the metal substrate prior to the formation of an under cladding layer. In this technique, irradiation light for the formation of cores is absorbed or attenuated by the irradiation light absorbing agent contained in the under cladding layer or by the irradiation light absorbing layer before or after being reflected diffusely from the surface of the metal substrate. This significantly reduces the amount of irradiation light directed obliquely from below to roughen the surfaces that are to become the side surfaces of the cores by exposing the surfaces thereto. As a result, this technique suppresses the surface roughening of the side surfaces of the cores.

Japanese Patent Application No. 2008-234735 discloses a technique in which a material that absorbs irradiation light for the formation of cores is used for a substrate having a roughened surface. In this technique, the irradiation light for the formation of the cores is absorbed by the substrate when the irradiation light reaches the surface of the substrate. This significantly reduces the amount of irradiation light directed obliquely from below to roughen the surfaces that are to become the side surfaces of the cores by exposing the surfaces thereto. As a result, this technique suppresses the surface roughening of the side surfaces of the cores.

Japanese Patent Application No. 2008-239346 discloses a technique in which either a colored-layer-coated substrate having a back surface on which a colored layer of a color that absorbs irradiation light is formed or a colored substrate entirely colored in a color that absorbs the irradiation light is used as a PET substrate. In this technique, the irradiation light for the formation of cores is absorbed by the colored layer or the colored substrate. This significantly reduces the amount of irradiation light directed obliquely from below to roughen the surfaces that are to become the side surfaces of the cores by exposing the surfaces thereto. As a result, this technique suppresses the surface roughening of the side surfaces of the cores.

Japanese Patent Application No. 2008-269688 discloses a technique in which either only a front surface or both front and back surfaces of a substrate (a silicon wafer, a glass substrate and the like) have an arithmetic mean roughness (Ra) in the range of 1 to 2 nm. In this technique, the surface that reflects irradiation light for the formation of cores is so smooth that the diffuse reflection of the irradiation light from the surface is suppressed. This significantly reduces the amount of irradiation light directed obliquely from below to roughen the surfaces that are to become the side surfaces of the cores by exposing the surfaces thereto. As a result, this technique suppresses the surface roughening of the side surfaces of the cores.

In this manner, the above-mentioned techniques of the Applications already filed by the assignee of the present application can suppress the surface roughening of the side surfaces of the cores to reduce the propagation losses of light. However, even when the surface roughening of the side surfaces of the cores is suppressed, the side surfaces of the cores are formed as roughened surfaces in some cases. The present inventors have made studies to diagnose the cause of such a phenomenon. As a result, the present inventors have found that the cause of the phenomenon lies in the contamination of the photomask for use in the formation of the cores. Specifically, a material for the formation of the cores and the like might be deposited onto portions of the photomask which surround the openings of the photomask because of the use of the photomask. In that case, the deposits on the portions of the photomask which surround the openings cause the irradiation light passing through the openings to follow irregular paths. This makes the irradiation light reaching the side surfaces of the cores uneven to result in the roughened side surfaces of the cores.

In the formation of an optical waveguide on the surface of a substrate, it has hence been required to suppress the surface roughening of the side surfaces of the cores, thereby reducing the propagation losses of light, regardless of the type of substrate.

SUMMARY OF THE INVENTION

In view of the foregoing, it is therefore an object of the present invention to provide a method of manufacturing an optical waveguide device which is capable of reducing light propagation losses in the cores of an optical waveguide when the optical waveguide is formed on a surface of a substrate, regardless of the type of substrate.

To accomplish the above-mentioned object, the present invention is intended for a method of manufacturing an optical waveguide device. The method comprises the steps of: (a) forming an under cladding layer on the front surface of a substrate; (b) forming a first photosensitive resin layer for core formation on a surface of the under cladding layer; (c) directing irradiation light through openings of a photomask toward the first photosensitive resin layer to expose the first photosensitive resin layer in a predetermined pattern to the irradiation light, thereby forming an exposed portion of the first photosensitive resin layer into a core; (d) selecting a photosensitive resin composition of a non-solvent type for over cladding layer formation to form a second photosensitive resin layer for the over cladding layer formation so as to cover at least the side surfaces of the core; (e) heating the second photosensitive resin layer to form an interface portion between the core and the second photosensitive resin layer into a mixed layer that is a mixture of a resin material for the core formation and the photosensitive resin composition; and (f) directing irradiation light toward the second photosensitive resin layer to expose the second photosensitive resin layer to the irradiation light, thereby forming an exposed portion of the second photosensitive resin layer into an over cladding layer.

The present inventors have made studies of the method of manufacturing the optical waveguide device to reduce the propagation losses of light in the core. In the course of the studies, the present inventors have hit upon the idea of eliminating the influence of the surface roughening of the side surfaces of the core in the step of forming the over cladding layer after the side surfaces of the core are roughened, rather than the method of suppressing the surface roughening of the side surfaces of the core, which has been applied for in patents by the assignee of the present application. Based on the idea, the present inventors have made further studies. As a result, after the side surfaces of the core are formed as roughened surfaces because of the irregular paths of the irradiation light resulting from the type of substrate, the contamination of the photomask and the like during the formation of the core, the photosensitive resin composition of a non-solvent type is selected as the material for the formation of the over cladding layer that covers the core, and a heating treatment is performed on the second photosensitive resin layer made of the photosensitive resin composition so as to cover at least the side surfaces of the core prior to the irradiation of the second photosensitive resin layer with the irradiation light. Thus, the present inventors have found that the interface portion between the core and the second photosensitive resin layer is formed into a mixed layer that is a mixture of the resin material for the core formation and the photosensitive resin composition for the formation of the over cladding layer. Then, the present inventors have found that light propagates more intensely to a portion inside the mixed layer, that is, a central portion of the core as viewed in section whereas only a slight amount of light propagates to the side surfaces of the core formed as the roughened surfaces. Thus, the present inventors have found that the propagated light is only slightly influenced by the surface roughening of the side surfaces of the core, whereby light propagation losses are reduced, and have attained the present invention.

The present invention does not use a composition of a solvent type but selects the composition of the non-solvent type as the photosensitive resin composition for the formation of the over cladding layer. This does not require heating for volatilizing the solvent which has been necessary when the composition of the solvent type is used. The present invention breaks the bounds of common technical practice, and performs the heating treatment on the second photosensitive resin layer made of the photosensitive resin composition. The heating treatment causes the photosensitive resin composition for the formation of the over cladding layer to penetrate into the resin material in the core surface portion, so that the photosensitive resin composition and the resin material mix together. This mixture becomes the mixed layer. Thereafter, irradiation light is directed toward the second photosensitive resin layer to expose the second photosensitive resin layer thereto. This hardens the mixed layer, and also hardens a portion of the second photosensitive resin layer except where the mixed layer is formed, whereby this portion is formed into the over cladding layer.

In this process, because the mixed layer is a mixture of the resin material for the core formation and the photosensitive resin composition for the formation of the over cladding layer, the refractive index of the mixed layer has a value intermediate between those of the core and the over cladding layer, and is lower than that of the core. For this reason, light in the core is reflected from the interface between the core and the mixed layer. As a result, only a slight amount of light propagates to the side surfaces of the core formed as roughened surfaces. Thus, the propagated light is only slightly influenced by the surface roughening of the side surfaces of the core, whereby light propagation losses are reduced. Additionally, in the step of forming the over cladding layer, if the irradiation light for the formation of the over cladding layer is reflected diffusely from the substrate, the formation of the outer side surfaces of the mixed layer as roughened surfaces prevents the roughened surfaces from exerting adverse effect on the propagation of light in the core.

The term "(second) photosensitive resin composition of non-solvent type" as used herein means a composition having therein no solvent for dissolving resin serving as a main component. An additive component added for the preparation of the composition may contain a solvent. The term "main component" as used herein refers to a component that makes up at least 50% of the whole, and is to be interpreted as including the meaning that the whole consists only of the main component.

A photosensitive resin composition for the formation of the over cladding layer containing no solvent has also been used in the conventional methods of manufacturing an optical waveguide device. Because no solvent is contained, a photosensitive resin layer made of the photosensitive resin composition is not subjected to the heating treatment for volatilizing a solvent. For this reason, the surface roughening of the side surfaces of the core remains after the formation of the over cladding layer in the conventional methods. In other words, the optical waveguide has been of a step index type.

In the method of manufacturing the optical waveguide device according to the present invention, the side surfaces of the core are temporarily formed as roughened surfaces in some cases because of the irregular paths of the irradiation light resulting from the type of substrate, the contamination of the photomask and the like during the exposure to the irradiation light for the formation of the core. However, in the subsequent step of forming the over cladding layer, the photosensitive resin composition of the non-solvent type is selected as the material for the formation of the over cladding layer to form the second photosensitive resin layer so as to cover at least the side surfaces of the core, and the second photosensitive resin layer is heated prior to the exposure of the second photosensitive resin layer to the irradiation light. The above-mentioned heating causes the interface portion (including the roughened side surfaces of the core) between the core and the second photosensitive resin layer to be formed into the mixed layer that is a mixture of the resin material for the core formation and the photosensitive resin composition for the formation of the over cladding layer. Accordingly, the refractive index of the mixed layer formed as a new layer has a value intermediate between those of the core and the over cladding layer, and is lower than that of the core itself. For this reason, light in the core is reflected from the interface between the core and the mixed layer, so that the leakage of light is reduced or eliminated. In this manner, the propagation losses of light in the core are reduced according to the present invention by the formation of the mixed layer. Also, if the side surfaces of the core are not formed as roughened surfaces because of the use of a substrate and a photomask that do not cause the irradiation light to follow irregular paths, the propagation losses of light in the core is further reduced by the formation of the mixed layer as mentioned above. Furthermore, the method of manufacturing the optical waveguide device according to the present invention does not suppress the surface roughening of the side surfaces of the core in a conventional manner, but reduces the propagation losses of light in the core by the formation of the mixed layer in the interface portion between the core and the over cladding layer in the step of forming the over cladding layer if the side surfaces of the core are roughened. This eliminates the need to form a new layer such as an irradiation light absorbing layer and the like to provide the advantage of preventing the increase in the total thickness of the optical waveguide device.

Preferably, the heating temperature of the second photosensitive resin layer for the formation of the over cladding layer is not lower than a temperature 20° C. lower than the glass transition temperature of the resin material for the core formation, and the heating time thereof is not longer than 30 minutes. The above-mentioned heating temperature and time provide the mixed layer more appropriately, to thereby further reduce the propagation losses of light in the core. Although the above-mentioned heating temperature is not lower than the temperature 20° C. lower than the glass transition temperature of the resin material for the core formation as mentioned above, the upper limit of the heating temperature is, of course, the decomposition temperature of resin or lower, typically 200° C. or lower. Although the above-mentioned heating time is not longer than 30 minutes as mentioned above, the lower limit of the heating time is longer than zero.

When the above-mentioned substrate is a stainless steel substrate including a surface having an arithmetic mean roughness (Ra) of not less than 0.095 μm, various dimensions of the stainless steel substrate are maintained substantially at their design values in the course of the manufacture of the optical waveguide device because the stainless steel substrate is excellent in resistance to thermal expansion and contraction. When the above-mentioned stainless steel substrate is used, the irradiation light directed toward the first photosensitive resin layer for the formation of the core is transmitted through the first photosensitive resin layer for the formation of the core, and then reaches and is reflected from the front surface of the stainless steel substrate.

When the above-mentioned substrate is a synthetic resin substrate (PET substrate) containing a lubricant material and having polyethylene terephthalate as a main component, cost reduction is achieved because the PET substrate is less costly. When the above-mentioned PET substrate is used, the irradiation light directed toward the first photosensitive resin layer for the formation of the core is transmitted through the first photosensitive resin layer for the formation of the core and through the front surface of the PET substrate, and then reaches and is reflected from the bottom surface of the PET substrate.

DETAILED DESCRIPTION

Embodiments according to the present invention will now be described in detail with reference to the drawings.

Figure 1A:
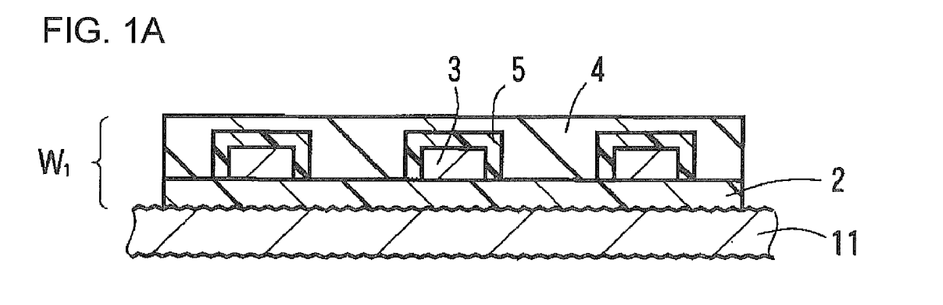
FIG. 1 is a sectional view schematically showing an optical waveguide device provided by a method of manufacturing an optical waveguide device according to a first embodiment of the present invention.

FIG. 1 shows an optical waveguide device provided by a method of manufacturing an optical waveguide device according to a first embodiment of the present invention. This optical waveguide device includes a metal substrate 11 having a surface with an arithmetic mean roughness (Ra) of not less than 0.095 μm, and an optical waveguide $W_1$ formed on the surface of the metal substrate 11. The optical waveguide $W_1$ includes an under cladding layer 2 formed on the surface of the metal substrate 11, and is manufactured in a manner to be described below. Specifically, a first photosensitive resin layer 3A (with reference to FIG. 2B) is formed on a surface of the under cladding layer 2. Thereafter, irradiation light L is directed toward the first photosensitive resin layer 3A to expose the first photosensitive resin layer 3A in a predetermined pattern to the irradiation light L, thereby forming cores 3. Further, a second photosensitive resin layer 4A (with reference to FIG. 2D) covering the cores 3 is formed and heated. This causes interface portions between the cores 3 and the second photosensitive resin layer 4A to be formed into mixed layers 5. Thereafter, irradiation light is directed toward the second photosensitive resin layer 4A to expose the second photosensitive resin layer 4A to the irradiation light, thereby forming an over cladding layer 4. The optical waveguide $W_1$ is thus manufactured. The irradiation light L for exposure is irradiation light reaching the surface of the metal substrate 11 and reflected therefrom. The mixed layers 5 are viewable by magnifying a section of the optical waveguide device approximately 700 times with an electron microscope.

Next, the method of manufacturing the optical waveguide device according to the first embodiment will be described in detail.

First, the metal substrate 11 (with reference to FIG. 2A) is prepared. Examples of the metal substrate 11 used herein include substrates made of stainless steel (SUS), copper, aluminum, nickel and the like. Of these, the stainless steel substrate is preferable. This is because the stainless steel substrate is excellent in resistance to thermal expansion and contraction so that various dimensions thereof are maintained substantially at their design values in the course of the manufacture of the optical waveguide device. This type of stainless steel substrate used typically is commercially available. The commercially available stainless steel substrate has both front and back surfaces that are roughened in the course of the manufacture thereof. The arithmetic mean roughness (Ra) of the surfaces of the commercially available stainless steel substrates is not less than 0.095 μm. For example, a metal substrate having a thickness in the range of 20 μm to 1 mm is used as the metal substrate 11. The arithmetic mean roughness (Ra) according to the present invention is a surface roughness defined in JIS B 0601 (1994).

Figure 2A:
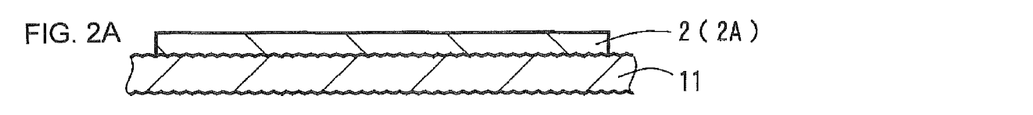
FIGS. 2A to 2E are illustrations schematically showing the manufacturing method according to the first embodiment of the present invention.

Then, as shown in FIG. 2A, a photosensitive resin composition for the formation of the under cladding layer 2 is applied to a predetermined region of the surface of the metal substrate 11. Thereafter, the photosensitive resin composition is dried by a heating treatment at 50 to 150° C. for 1 to 30 minutes, as required. This provides a photosensitive resin layer 2A for the formation of the under cladding layer 2. Examples of the above-mentioned photosensitive resin composition include a photosensitive epoxy resin composition, a photosensitive acrylic resin composition, and the like. The application of the above-mentioned photosensitive resin composition is achieved, for example, by a spin coating method, a dipping method, a casting method, an injection method, an ink jet method and the like.

Next, the photosensitive resin layer 2A is exposed to irradiation light. Examples of the irradiation light for exposure used herein include visible light, ultraviolet light, infrared light, X-rays, alpha rays, beta rays, gamma rays and the like. Preferably, ultraviolet light (with a wavelength of 250 to 400 nm) is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 mJ/cm$^2$, preferably 50 to 3000 mJ/cm$^2$.

After the exposure, a heating treatment is performed to complete the photoreaction. This heating treatment is performed at 80 to 250° C., preferably at 100 to 150° C., for 10 seconds to two hours, preferably for five minutes to one hour. This causes the photosensitive resin layer 2A to be formed into the under cladding layer 2, as shown in FIG. 2A. The thickness of the under cladding layer 2 is typically in the range of 1 to 50 μm, preferably in the range of 5 to 30 μm.

Figure 2B:
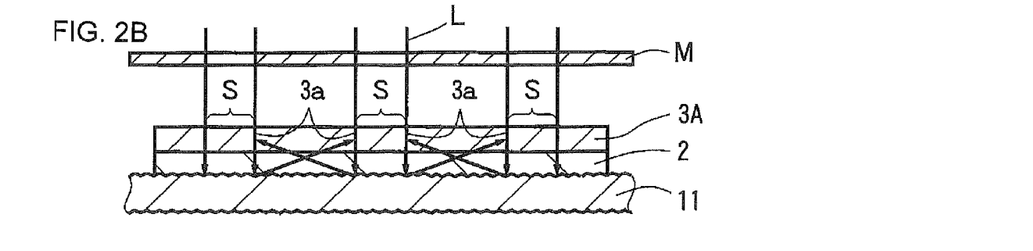

Then, as shown in FIG. 2B, the photosensitive resin layer (the first photosensitive resin layer) 3A for the formation of the cores 3 is formed on the surface of the under cladding layer 2. The formation of this photosensitive resin layer 3A is carried out by a spin coating method and the like using a photosensitive epoxy resin composition and the like as a material in a manner similar to the process for forming the photosensitive resin layer 2A for the formation of the under cladding layer 2, which is described with reference to FIG. 2A. The cores 3 are required to have a refractive index higher than that of the under cladding layer 2 and the over cladding layer 4 (with reference to FIG. 2D). The adjustment of the refractive indices may be made, for example, by adjusting the selection of the types of the materials for the formation of the under cladding layer 2, the cores 3 and the over cladding layer 4 described above and the composition ratio thereof.

Thereafter, a photomask M formed with an opening pattern corresponding to the pattern of the cores 3 is placed over the photosensitive resin layer 3A for the formation of the cores 3. Portions of the photosensitive resin layer 3A corresponding to the opening pattern are exposed to the irradiation light L through the photomask M. This exposure is performed in a manner similar to that in the step of forming the under cladding layer 2 mentioned earlier. During the exposure, the irradiation light L is directed to the photosensitive resin layer 3A at right angles thereto to cause the photoreaction to proceed in the portions exposed to the irradiation light L, thereby hardening the exposed portions. This irradiation light L is transmitted through the photosensitive resin layer 3A and the under cladding layer 2, and thereafter reaches the surface of the metal substrate 11.

The irradiation light L reaching the surface of the metal substrate 11 is reflected diffusely from the surface of the metal substrate 11 and is transmitted through the under cladding layer 2 obliquely upwardly from below because the surface of the metal substrate 11 is a roughened surface with an arithmetic mean roughness (Ra) of not less than 0.095 μm. Then, boundary surfaces (surfaces that are to become side surfaces 3a) for the patterning of the cores 3 are exposed to the irradiation light L directed obliquely from below in future core regions S included in the photosensitive resin layer 3A for the core formation. This exposure to the irradiation light L directed obliquely from below results from the above-mentioned diffuse reflection, and is uneven. Thus, an unwanted photoreaction proceeds unevenly at the surfaces that are to become the side surfaces 3a of the cores 3. This causes the surfaces that are to become the side surfaces 3a of the cores 3 to have both portions subjected to a low degree of exposure to light and portions subjected to a high degree of exposure to light, thereby resulting in roughened surfaces in a subsequent step of development (in which unexposed portions and the portions subjected to a low degree of exposure to light are dissolved away). The uneven exposure of the surfaces that are to become the side surfaces 3a of the cores 3 to the irradiation light L because of the diffuse reflection of the irradiation light L shown in FIG. 2B is similar to the conventional uneven exposure shown in FIG. 8.

Figure 2C:
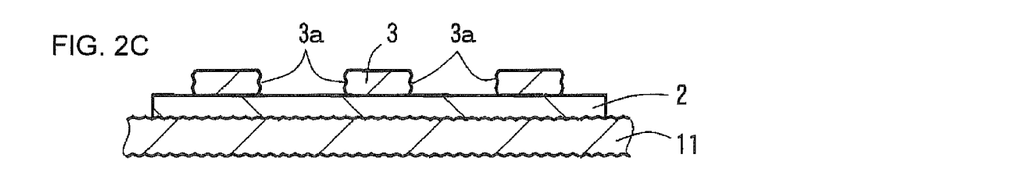

After the above-mentioned exposure, a heating treatment is performed to complete the photoreaction in a manner similar to that in the step of forming the under cladding layer 2 mentioned earlier. Then, development is performed using a developing solution. This dissolves away the unexposed portions of the photosensitive resin layer 3A to cause the remaining portions of the photosensitive resin layer 3A on the under cladding layer 2 to be formed into the pattern of the cores 3, as shown in FIG. 2C. In this process, the portions subjected to a low degree of exposure to light are dissolved away from the surfaces that are to become the side surfaces 3a of the cores 3, and the portions subjected to a high degree of exposure to light remain unremoved. Thus, the surfaces that are to become the side surfaces 3a of the cores 3 appear as roughened surfaces. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of the photosensitive resin material.

After the above-mentioned development, the developing solution remaining on the surface and the like of the photosensitive resin layer 3A formed in the pattern of the cores 3 is removed by a heating treatment. This heating treatment is typically performed at 80 to 150° C. for one to 30 minutes. This causes the photosensitive resin layer 3A formed in the pattern of the cores 3 to be formed into the cores 3. The side surfaces 3a of the cores 3 are roughened, as mentioned earlier. The thickness of the cores 3 is typically in the range of 10 to 150 μm, preferably in the range of 20 to 100 μm. The width of the cores 3 is typically in the range of 8 to 70 μm, preferably in the range of 10 to 60 μm.

Figure 2D:
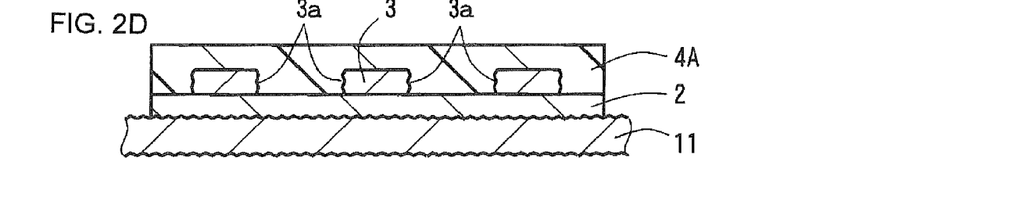

Next, as shown in FIG. 2D, a photosensitive resin composition, such as a photosensitive epoxy resin composition and a photosensitive acrylic resin composition, of a non-solvent type (with a solvent concentration of 0% by weight) is used as a material (a second photosensitive resin composition) for the formation of the over cladding layer 4 to form the photosensitive resin layer (the second photosensitive resin layer) 4A for the formation of the over cladding layer 4 on the surface of the under cladding layer 2 so as to cover the cores 3. Examples of the photosensitive resin composition used herein include a varnish prepared by dissolving a photosensitive resin in a liquid monomer, and a varnish in which the photosensitive resin itself is a liquid monomer. The formation of the photosensitive resin layer 4A is achieved by a spin coating method, a dipping method, a casting method, an injection method, an ink jet method and the like in a manner similar to that of the photosensitive resin layer 2A for the formation of the under cladding layer 2, which is described with reference to FIG. 2A.

Figure 2E:
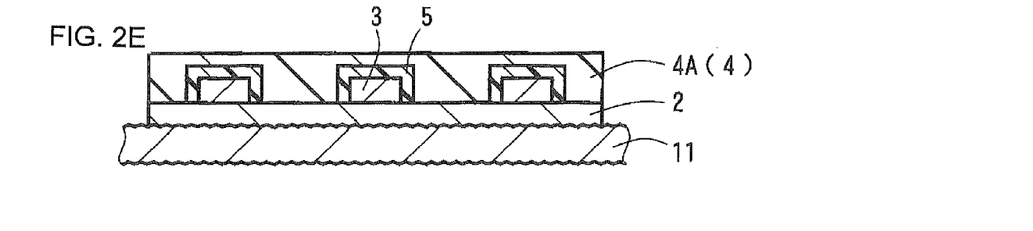

As shown in FIG. 2E, the photosensitive resin layer 4A is heated according to the present invention in spite of the fact that the photosensitive resin layer 4A is of the non-solvent type. This causes the second photosensitive resin composition for the formation of the over cladding layer 4 which is left applied and unhardened to penetrate into the resin material for the formation of the cores 3 in the interface portions between the cores 3 and the second photosensitive resin layer 4A, so that the second photosensitive resin composition and the resin material mix together. This mixture is formed into the mixed layers 5. This step is a striking feature of the present invention.

The heating treatment of the second photosensitive resin layer 4A for the formation of the over cladding layer 4 is typically performed at 60 to 150° C. for one to 30 minutes. In particular, the heating temperature of the second photosensitive resin layer 4A is preferably in the range from a temperature 20° C. lower than the glass transition temperature of the resin material for the formation of the cores 3 to the decomposition temperature of resin (typically 200° C. or lower). The heating time of the second photosensitive resin layer 4A is preferably longer than zero and not longer than 30 minutes. This further optimizes the formation of the mixed layers 5 to further reduce the propagation losses of light in the cores 3.

Thereafter, irradiation light is directed toward the second photosensitive resin layer 4A to expose the second photosensitive resin layer 4A to the irradiation light, thereby hardening the mixed layers 5 and also hardening portions of the second photosensitive resin layer 4A except where the mixed layers 5 are formed, which in turn are formed into the over cladding layer 4. The thickness of the over cladding layer 4 (the thickness as measured from the surface of the cores 3) is typically in the range of 5 to 100 μm, preferably in the range of 10 to 80 μm.

In this manner, an optical waveguide device (with reference to FIG. 1) is provided in which the optical waveguide $W_1$ including the under cladding layer 2, the cores 3, the mixed layers 5 and the over cladding layer 4 described above is formed on the surface of the metal substrate 11. The optical waveguide $W_1$ in this optical waveguide device is small in light propagation losses to achieve good propagation of light because the formation of the mixed layers 5 allows the propagation of light with little influence of the roughened side surfaces 3a of the cores 3.

Figure 3:
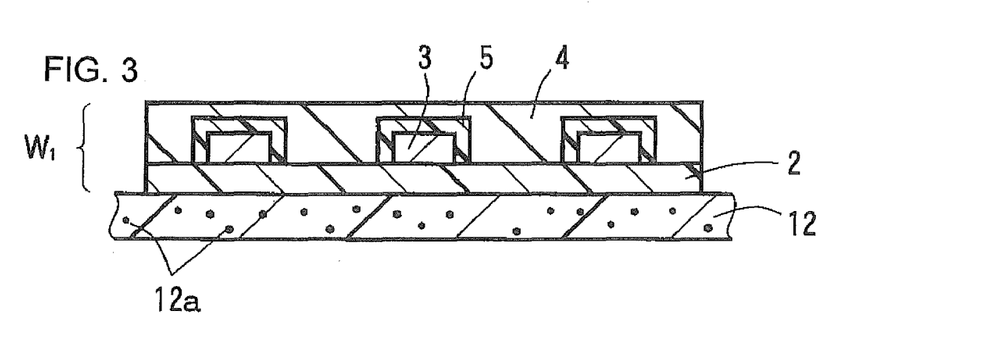
FIG. 3 is a sectional view schematically showing an optical waveguide device provided by the manufacturing method according to a second embodiment of the present invention.

FIG. 3 shows an optical waveguide device provided by the manufacturing method according to a second embodiment of the present invention. The optical waveguide device shown in FIG. 3 includes a synthetic resin substrate 12 containing a lubricant material 12a, and the optical waveguide $W_1$ formed on a surface of the synthetic resin substrate 12. This optical waveguide device according to the second embodiment differs from that of the first embodiment in the provision of the synthetic resin substrate 12, and is similar thereto in the provision of the optical waveguide $W_1$.

Specifically, a material for the formation of the synthetic resin substrate 12 used herein is a material transparent to irradiation light. As an example, a resin composition having polyethylene terephthalate (PET) and the like as a main component and also containing the lubricant material 12a is used for the synthetic resin substrate 12. In particular, the synthetic resin substrate (PET substrate) 12 having PET as a main component is preferable in view of its low cost. The PET substrate is colorless and clear. The PET substrate used typically is commercially available. The commercially available PET substrate inevitably contains the lubricant material 12a in the course of the manufacture thereof. The synthetic resin substrate 12 used herein has a thickness, for example, in the range of 20 μm to 1 mm. The term "main component" as used herein refers to a component that makes up at least 50% of the whole, and is to be interpreted as including meaning that the whole consists only of the main component.

In the method of manufacturing the optical waveguide device according to the second embodiment, the side surfaces 3a of the cores 3 are also formed as roughened surfaces because of the diffuse reflection of irradiation light from the synthetic resin substrate 12 in the step of forming the cores 3. However, the second embodiment differs from the first embodiment in the type of substrate for the formation of the optical waveguide $W_1$ thereon to accordingly differ therefrom in the conditions of the diffuse reflection of the irradiation light resulting from the substrate. Other parts of the second embodiment are similar to those of the first embodiment. It should be noted that the principle of the surface roughening of the side surfaces 3a of the cores 3 because of the diffuse reflection of the irradiation light is similar to the principle of the conventional surface roughening shown in FIG. 9.

Specifically, when the synthetic resin substrate 12 is used, irradiation light for use in exposure in the step of forming the cores 3 impinges upon and is reflected from the lubricant material 12a contained in the synthetic resin substrate 12 to follow irregular paths. As a result, most of the irradiation light reaches the bottom surface of the synthetic resin substrate 12 at an angle (with reference to FIG. 9). In general, the back surface (or the bottom surface) of the synthetic resin substrate 12 is in contact with a mounting surface of a mounting table and the like for placing the synthetic resin substrate 12 thereon, the mounting surface being impervious to the irradiation light. For this reason, the irradiation light reaching the bottom surface of the synthetic resin substrate 12 at an angle does not exit from the back surface of the synthetic resin substrate 12 but is reflected from the bottom surface of the synthetic resin substrate 12 obliquely upwardly. Thereafter, the reflected irradiation light impinges upon the lubricant material 12a in the synthetic resin substrate 12 to follow further irregular paths, and then exits from the front surface of the synthetic resin substrate 12 obliquely upwardly. The irradiation light exiting obliquely upwardly is transmitted through the under cladding layer 2 obliquely upwardly from below. Then, the boundary surfaces (the surfaces that are to become the side surfaces 3a) for the patterning of the cores 3 are exposed to the irradiation light directed obliquely from below in the future core regions S included in the photosensitive resin layer 3A for the formation of the cores 3. Because of the exposure to the irradiation light directed obliquely from below, the side surfaces 3a of the cores 3 are roughened.

Then, the over cladding layer 4 is formed in a manner similar to that in the first embodiment. This provides the optical waveguide device (with reference to FIG. 3) in which the mixed layers 5 are formed between the cores 3 and the over cladding layer 4. The optical waveguide device provided in this manner is also excellent in light propagation efficiency because of the formation of the mixed layers 5, as in the first embodiment.

Figure 4:
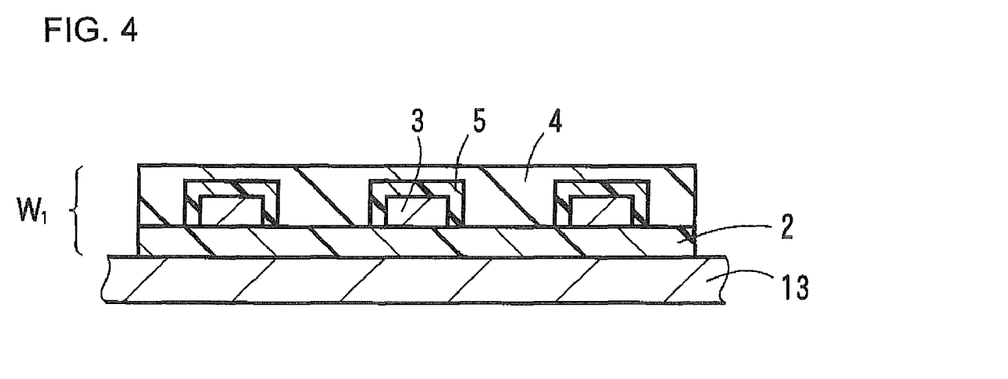
FIG. 4 is a sectional view schematically showing an optical waveguide device provided by the manufacturing method according to a third embodiment of the present invention.

FIG. 4 shows an optical waveguide device provided by the manufacturing method according to a third embodiment of the present invention. The optical waveguide device shown in FIG. 4 includes a smooth substrate 13, such as a silicon wafer, a glass substrate and the like, having a surface with an arithmetic mean roughness (Ra) of not greater than 2 nm, and the optical waveguide $W_1$ formed on a surface of the smooth substrate 13. The optical waveguide device according to the third embodiment differs from that of the first embodiment in the provision of the smooth substrate 13, and is similar thereto in the provision of the optical waveguide $W_1$.

In the third embodiment, a photomask (not shown) including portions surrounding the openings thereof onto which resin that is the material for the formation of the cores 3 or the like is deposited as contamination is used as the photomask for the formation of the cores 3. For this reason, the deposits such as the above-mentioned resin or the like cause the irradiation light passing through the openings of the photomask to follow irregular paths during the formation of the cores 3. This makes the irradiation light reaching the side surfaces 3a of the cores 3 uneven to result in the roughened side surfaces 3a of the cores 3. Since the smooth substrate 13 such as the silicon wafer has the surface so smooth as to have the arithmetic mean roughness (Ra) of not greater than 2 nm, the irradiation light is not reflected diffusely from the surface of the smooth substrate 13 to cause no surface roughening of the side surfaces 3a of the cores 3.

Also in the third embodiment, the over cladding layer 4 is then formed in a manner similar to that in the first embodiment. This provides the optical waveguide device (with reference to FIG. 4) which includes the mixed layers 5 formed between the cores 3 and the over cladding layer 4 to thereby have excellent light propagation efficiency.

The method of manufacturing the optical waveguide device according to a fourth embodiment of the present invention (not shown) will be described. According to the fourth embodiment, a photomask including portions surrounding the openings thereof onto which no unwanted deposits adhere (for example, an unused photomask, and a photomask from which unwanted deposits are removed) is used as the photomask for the formation of the cores 3, and cores having smooth side surfaces are used as the cores 3 in the third embodiment. Thereafter, the over cladding layer 4 is formed in a manner similar to that in the first embodiment. Thus, the mixed layers 5 are formed between the cores 3 and the over cladding layer 4.

In other words, the side surfaces 3a of the cores 3 are not formed as roughened surfaces, but the mixed layers 5 are formed as described above in the fourth embodiment. This provides the optical waveguide device having further improved light propagation efficiency.

Figure 5:
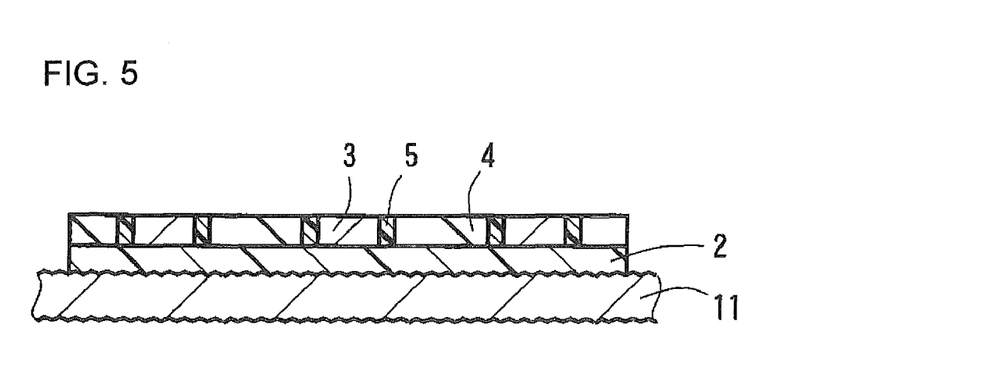
FIG. 5 is an illustration schematically showing the step of forming an over cladding layer in the manufacturing method according to a fifth embodiment of the present invention.

In the first to fourth embodiments described above, the photosensitive resin layer (the second photosensitive resin layer) 4A for the formation of the over cladding layer 4 is formed so as to cover not only the side surfaces 3a of the cores 3 but also the top surfaces thereof. However, the photosensitive resin layer 4A may be formed so as to cover only the side surfaces 3a of the cores 3, with the top surfaces of the cores 3 left uncovered, as shown in FIG. 5.

Next, inventive examples of the present invention will be described in conjunction with comparative examples. It should be noted that the present invention is not limited to the inventive examples.

EXAMPLES

Inventive Example 1

Metal Substrate

A stainless steel substrate made of SUS 304 foil (available from Toyo Seihaku Co., Ltd., and having a thickness of 20 µm and an arithmetic mean roughness (Ra) of 0.095 µm) was prepared. A color 3D laser microscope (VK-9700 available from Keyence Corporation) was used for the measurement of the arithmetic mean roughness (Ra), and the range of measurement was 200 µm by 200 µm.

Material of Non-Solvent Type for Formation of Under Cladding Layer and Over Cladding Layer A material for the formation of an under cladding layer and an over cladding layer was prepared by stirring (at a temperature of 90° C. at 300 rpm for one hour) to dissolve 35 parts by weight of bisphenoxyethanolfluorene diglycidyl ether (OGSOL EG available from Osaka Gas Chemicals Co., Ltd.) (component A), 40 parts by weight of 3',4'-epoxycyclohexylmethyl 3,4-epoxycyclohexanecarboxylate (an alicyclic epoxy resin CELLOXIDE 2021P available from Daicel Chemical Industries, Ltd.) (component B), 25 parts by weight of (3',4'-epoxycyclohexane)methyl-3',4'-epoxycyclohexyl carboxylate (CELLOXIDE 2081 available from Daicel Chemical Industries, Ltd.) (component C), and 2 parts by weight of a 50% by weight propione carbonate solution of 4,4'-bis[di(β-hydroxyethoxy)phenylsulfinio]phenylsulfide bishexafluoroantimonate (SP-170 available from ADEKA Corporation) (component D).

Material for Formation of Cores

A material for the formation of cores was prepared by stirring (at a temperature of 80° C. at 250 rpm for three hours) to dissolve 70 parts by weight of the aforementioned component A, 30 parts by weight of 1,3,3-tris{4-[2-(3-oxetanyl)]butoxyphenyl}butane (TrisP-RK-OX available from Nitto Denko Corporation), and one part by weight of the aforementioned component D in 39 parts by weight of ethyl lactate (available from Musashino Chemical Laboratory, Ltd.). The glass transition temperature of the material for the formation of the cores was 134° C. This glass transition temperature is readable from a loss tangent (tan δ) peak in viscoelastic measurement in a tensile mode. SDM/5600 available from Seiko Instruments Inc. was used as a device for such measurement.

Manufacture of Optical Waveguide Device

Formation of Under Cladding Layer

The above-mentioned stainless steel substrate was placed on a mounting table. The material for the formation of the under cladding layer was applied to a surface of the stainless steel substrate by using a spin coater (1X-DX2 available from Mikasa Co., Ltd.) to form a coating layer having a thickness of 20 μm. Thereafter, an exposure machine (MA-60F available from Mikasa Co., Ltd.) and an ultra-high-pressure mercury-vapor lamp (USH-250D available from Ushio Inc.) were used to irradiate the entire surface of the coating layer with ultraviolet light (mixed irradiation), thereby exposing the entire surface of the coating layer to the ultraviolet light at an integrated dose of 1000 mJ/cm$^2$. Subsequently, the resulting structure (the exposed coating layer on the stainless steel substrate) was allowed to stand for ten minutes on a hot plate at 100° C. so that the reaction was completed. In this manner, the under cladding layer was formed.

Formation of Cores

Then, the material for the formation of the cores was applied to a surface of the under cladding layer by using the above-mentioned spin coater, and thereafter was allowed to stand for ten minutes on a hot plate at 70° C. so that the solvent was volatilized. Thus, a first photosensitive resin layer for the formation of the cores was formed. Next, the above-mentioned exposure machine and the above-mentioned ultra-high-pressure mercury-vapor lamp were used to irradiate the first photosensitive resin layer with ultraviolet light (having a wavelength of 365 nm) through an unused photomask made of quartz and formed with an opening pattern in the form of 12 straight lines (in the form of rectangles with a length of 120 mm and a width of 50 μm, and at spacings of 200 μm between lengthwise sides of the rectangles), thereby exposing the first photosensitive resin layer to the ultraviolet light at an integrated dose of 2000 mJ/cm$^2$. Thereafter, the resulting structure (the exposed first photosensitive resin layer on the under cladding layer formed on the stainless steel substrate) was allowed to stand for ten minutes on a hot plate at 70° C. so that the reaction was completed. Next, development (dip development) was performed by dipping the resulting structure in a developing solution including γ-butyrolactone (available from Mitsubishi Chemical Corporation) for two minutes to dissolve away unexposed portions of the first photosensitive resin layer. Thereafter, the resulting structure was rinsed with distilled water. Then, the resulting structure was dried by allowing the resulting structure to stand for ten minutes on a hot plate at 120° C. In this manner, the cores (having a height of 50 μm) were formed.

Formation of Mixed Layers and Over Cladding Layer

Then, the material for the formation of the over cladding layer was applied to the surface of the under cladding layer by using the above-mentioned spin coater so as to cover the cores, thereby forming a second photosensitive resin layer for the formation of the over cladding layer. Then, a heating treatment was performed in which the resulting structure was allowed to stand for ten minutes on a hot plate at 80° C. This heating treatment caused interface portions between the cores and the second photosensitive resin layer to be formed into mixed layers. Next, the above-mentioned exposure machine and the above-mentioned ultra-high-pressure mercury-vapor lamp were used to irradiate the second photosensitive resin layer with ultraviolet light (mixed irradiation), thereby exposing the second photosensitive resin layer to the ultraviolet light at an integrated dose of 2000 mJ/cm$^2$. Then, the resulting structure was allowed to stand for ten minutes on a hot plate at 120° C. so that the reaction was completed. This formed the over cladding layer. In this manner, an optical waveguide (having a total thickness of 100 μm) was formed on the surface of the stainless steel substrate, whereby an optical waveguide device was provided.

Inventive Example 2

The heating treatment (the formation of the mixed layers) prior to the emission of the ultraviolet light in the step of forming the over cladding layer in Inventive Example 1 was performed by allowing the resulting structure to stand for ten minutes on a hot plate at 100° C. Except for this difference, an optical waveguide device in Inventive Example 2 was manufactured in a manner similar to that in Inventive Example 1 described above.

Inventive Example 3

The heating treatment (the formation of the mixed layers) prior to the emission of the ultraviolet light in the step of forming the over cladding layer in Inventive Example 1 was performed by allowing the resulting structure to stand for ten minutes on a hot plate at 120° C. Except for this difference, an optical waveguide device in Inventive Example 3 was manufactured in a manner similar to that in Inventive Example 1 described above.

Inventive Example 4

The heating treatment (the formation of the mixed layers) prior to the emission of the ultraviolet light in the step of forming the over cladding layer in Inventive Example 1 was performed by allowing the resulting structure to stand for one minute on a hot plate at 140° C. Except for this difference, an optical waveguide device in Inventive Example 4 was manufactured in a manner similar to that in Inventive Example 1 described above.

Comparative Example 1

The heating treatment (the formation of the mixed layers) prior to the emission of the ultraviolet light in the step of forming the over cladding layer in Inventive Example 1 was not performed. Except for this difference, an optical waveguide device in Comparative Example 1 was manufactured in a manner similar to that in Inventive Example 1 described above.

Inventive Example 5

Lubricant-Material-Containing Synthetic Resin Substrate

A colorless and clear PET substrate (available from Toray Industries, Inc., Type T60, under the product designation 188, and having a thickness of 188 μm) was prepared.

Then, the under cladding layer, the cores, the mixed layers, and the over cladding layer were formed on a surface of the PET substrate in a manner similar to that in Inventive Example 1 described above, whereby an optical waveguide device in Inventive Example 5 was manufactured.

Inventive Example 6

The heating treatment (the formation of the mixed layers) prior to the emission of the ultraviolet light in the step of forming the over cladding layer in Inventive Example 5 was performed by allowing the resulting structure to stand for ten minutes on a hot plate at 100° C. Except for this difference, an optical waveguide device in Inventive Example 6 was manufactured in a manner similar to that in Inventive Example 5 described above.

Inventive Example 7

The heating treatment (the formation of the mixed layers) prior to the emission of the ultraviolet light in the step of forming the over cladding layer in Inventive Example 5 was performed by allowing the resulting structure to stand for ten minutes on a hot plate at 120° C. Except for this difference, an optical waveguide device in Inventive Example 7 was manufactured in a manner similar to that in Inventive Example 5 described above.

Inventive Example 8

The heating treatment (the formation of the mixed layers) prior to the emission of the ultraviolet light in the step of forming the over cladding layer in Inventive Example 5 was performed by allowing the resulting structure to stand for one minute on a hot plate at 140° C. Except for this difference, an optical waveguide device in Inventive Example 8 was manufactured in a manner similar to that in Inventive Example 5 described above.

Comparative Example 2

The heating treatment (the formation of the mixed layers) prior to the emission of the ultraviolet light in the step of forming the over cladding layer in Inventive Example 5 was not performed. Except for this difference, an optical waveguide device in Comparative Example 2 was manufactured in a manner similar to that in Inventive Example 5 described above.

Inventive Example 9

Smooth Substrate

A glass substrate [available from Central Glass Co., Ltd., and having dimensions of 140 mm×140 mm×1.1 mm (thick) and a surface with an arithmetic mean roughness (Ra) of 2 nm] was prepared.

Then, the under cladding layer, the cores, the mixed layers, and the over cladding layer were formed on a surface of the glass substrate in a manner similar to that in Inventive Example 1 described above, whereby an optical waveguide device in Inventive Example 9 was manufactured. The material for the formation of the cores was deposited on portions of the quartz photomask used in the step of forming the cores which surrounded the openings of the photomask. The heating treatment (the formation of the mixed layers) prior to the emission of the ultraviolet light in the step of forming the over cladding layer was performed by allowing the resulting structure to stand for five minutes on a hot plate at 125° C. Except for this difference, the optical waveguide device in Inventive Example 9 was manufactured in a manner similar to that in Inventive Example 1 described above.

Inventive Example 10

The heating treatment (the formation of the mixed layers) prior to the emission of the ultraviolet light in the step of forming the over cladding layer in Inventive Example 9 was performed by allowing the resulting structure to stand for five minutes on a hot plate at 150° C. Except for this difference, an optical waveguide device in Inventive Example 10 was manufactured in a manner similar to that in Inventive Example 9 described above.

Comparative Example 3

The heating treatment (the formation of the mixed layers) prior to the emission of the ultraviolet light in the step of forming the over cladding layer in Inventive Example 9 was not performed. Except for this difference, an optical waveguide device in Comparative Example 3 was manufactured in a manner similar to that in Inventive Example 9 described above.

Inventive Example 11

The quartz photomask used in the step of forming the cores in Inventive Example 9 was an unused one (including portions surrounding the openings thereof onto which no unwanted deposits adhered). Except for this difference, an optical waveguide device in Inventive Example 11 was manufactured in a manner similar to that in Inventive Example 9 described above.

Inventive Example 12

The heating treatment (the formation of the mixed layers) prior to the emission of the ultraviolet light in the step of forming the over cladding layer in Inventive Example 11 was performed by allowing the resulting structure to stand for five minutes on a hot plate at 150° C. Except for this difference, an optical waveguide device in Inventive Example 12 was manufactured in a manner similar to that in Inventive Example 11 described above.

Comparative Example 4

The heating treatment (the formation of the mixed layers) prior to the emission of the ultraviolet light in the step of forming the over cladding layer in Inventive Example 11 was not performed. Except for this difference, an optical waveguide device in Comparative Example 4 was manufactured in a manner similar to that in Inventive Example 11 described above.

Measurement of Light Propagation Losses

In each of the optical waveguide devices in Inventive Examples 1 to 12 and Comparative Examples 1 to 4 described above, the optical waveguide was stripped from the substrate such as the stainless steel substrate, and the optical waveguide brought into the form of a film was affixed to a dicing tape (UE-111AJ available from Nitto Denko Corporation). A dicing device (DAD522 available from Disco Corporation) and a dicing blade (NBC-Z2050 available from Disco Corporation and having dimensions of 50.6×0.025×40 mm) were used to cut the optical waveguide affixed to the dicing tape to a length of 10 cm at a cutting speed of 0.3 mm per second, thereby exposing or uncovering longitudinal end surfaces of the cores. An optical multi power meter (Q8221 available from Advantest Corporation) was used to measure light propagation losses (total losses). A 850-nm VCSEL (OP250 available from Miki Inc.) was used as a light source, and an incident fiber [FFP-G120-0500 (a multimode fiber having a diameter of 50 μm and a numerical aperture NA of 0.2) available from Miki Inc.] was used between a light-receiving end surface of the optical waveguide and the light source to collect light from the light source. Also, a lens [FH14-11 (having a magnification of 20 times and a numerical aperture NA of 0.4) available from SEIWA OPTICAL CO., Ltd] was used between a light-emitting end surface of the optical waveguide and the optical multi power meter.

TABLE 1

| Stainless Steel Substrate | | Inventive Examples | | | | Comp. Example |
|---|---|---|---|---|---|---|
| | | 1 | 2 | 3 | 4 | 1 |
| Heating Treatment | Temperature (° C.) | 80 | 100 | 120 | 140 | No |
| | Time (min.) | 10 | 10 | 10 | 1 | |
| Light Propagation Losses (dB/10 cm) | | 6.5 | 4.2 | 2.2 | 2.5 | 7.0 |

TABLE 2

| PET Substrate | | Inventive Examples | | | | Comp. Example |
|---|---|---|---|---|---|---|
| | | 5 | 6 | 7 | 8 | 2 |
| Heating Treatment | Temperature (° C.) | 80 | 100 | 120 | 140 | No |
| | Time (min.) | 10 | 10 | 10 | 1 | |
| Light Propagation Losses (dB/10 cm) | | 4.6 | 3.8 | 2.3 | 2.1 | 4.7 |

TABLE 3

| Glass Substrate | | Inventive Examples | | Comp. Example |
|---|---|---|---|---|
| | | 9 | 10 | 3 |
| Heating Treatment | Temperature (° C.) | 125 | 150 | No |
| | Time (min.) | 5 | 5 | |
| Light Propagation Losses (dB/10 cm) | | 1.3 | 1.2 | 2.5 |

TABLE 4

| Glass Substrate | | Inventive Examples | | Comp. Example |
|---|---|---|---|---|
| | | 11 | 12 | 4 |
| Heating Treatment | Temperature (° C.) | 125 | 150 | No |
| | Time (min.) | 5 | 5 | |
| Light Propagation Losses (dB/10 cm) | | 1.3 | 1.2 | 1.7 |

The results given in Tables 1 to 3 show that the light propagation losses in Inventive Examples 1 to 4 are reduced, as compared with those in Comparative Example 1, that the light propagation losses in Inventive Examples 5 to 8 are reduced, as compared with those in Comparative Example 2, and that the light propagation losses in Inventive Examples 9 and 10 are reduced, as compared with those in Comparative Example 3. This indicates that, in Inventive Examples 1 to 10, the mixed layers are formed by the heating treatment prior to the emission of the ultraviolet light in the step of forming the over cladding layer, whereby the propagation of light is little influenced by the surface roughening of the side surfaces of the cores. In particular, it is noted that the light propagation losses are further reduced in Inventive Examples 3, 4, 7, 8, 9 and 10 in which the temperature for the heating treatment prior to the emission of the ultraviolet light is close to the glass transition temperature (135° C.) of the material for the formation of the cores.

In Comparative Example 4, the side surfaces of the cores were not formed as roughened surfaces because the glass substrate having the smooth surface [with an arithmetic mean roughness (Ra) of 2 nm] was used as the substrate and the quartz photomask used for the formation of the cores was the unused one. In actuality, the light propagation losses in Comparative Example 4 were small, as shown in Table 4. In such a case, it is noted that the light propagation losses are further reduced, as shown in Table 4, by performing the heating treatment prior to the emission of the ultraviolet light in the step of forming the over cladding layer to form the mixed layers, as in Inventive Examples 11 and 12.

The method of manufacturing the optical waveguide device according to the present invention is applicable to optical communications, optical information processing, and the manufacture of an optical waveguide device for a detection means for detecting a finger touch position and the like on a touch panel.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. A method of manufacturing an optical waveguide device, comprising the steps of:
   (a) forming an under cladding layer on the front surface of a substrate;
   (b) forming a first photosensitive resin layer for core formation on a surface of said under cladding layer;
   (c) directing a first irradiation light through openings of a photomask toward said first photosensitive resin layer to expose said first photosensitive resin layer in a predetermined pattern to the irradiation light, thereby forming an exposed portion of said first photosensitive resin layer into a core;
   (d) forming a second photosensitive resin layer for over cladding layer formation covering at least the side surfaces of said core, wherein said second photosensitive resin layer is selected from a non-solvent type photosensitive resin composition;
   (e) heating said second photosensitive resin layer to form an interface portion between said core and said second photosensitive resin layer into a mixed layer that is a mixture of a resin material for the core formation and said photosensitive resin composition; and
   (f) following said heating, directing a second irradiation light toward said second photosensitive resin layer to expose said second photosensitive resin layer to the irradiation light, thereby forming an exposed portion of said second photosensitive resin layer into an over cladding layer.

2. The method according to claim 1, wherein the first irradiation light directed toward said first photosensitive resin layer and said substrate is selected from the group consisting of the following combinations (A) and (B):
   (A) irradiation light transmitted through said first photosensitive resin layer, reaching the front surface of said substrate and reflected from the front surface of said substrate, and a metal substrate including a surface having an arithmetic mean roughness (Ra) of not less than 0.095 µm; and (B) irradiation light transmitted through said first photosensitive resin layer and through the front surface of said substrate, reaching the bottom surface of said substrate and reflected from the bottom surface of said substrate, and a synthetic resin substrate containing a lubricant material.

3. The method according to claim 1, wherein said irradiation light is caused to follow irregular paths by unwanted deposits adhering to portions of said photomask surrounding the openings of said photomask.

4. The method according to claim 1, wherein said step (e), the heating temperature of said second photosensitive resin layer is not lower than a temperature 20° C. lower than the glass transition temperature of said resin material for the core formation, and the heating time thereof is not longer than 30 minutes.

5. The method according to claim 2, wherein said step (e), the heating temperature of said second photosensitive resin layer is not lower than a temperature 20° C. lower than the glass transition temperature of said resin material for the core formation, and the heating time thereof is not longer than 30 minutes.

6. The method according to claim 3, wherein said step (e), the heating temperature of said second photosensitive resin layer is not lower than a temperature 20° C. lower than the glass transition temperature of said resin material for the core formation, and the heating time thereof is not longer than 30 minutes.

7. The method according to claim 2, wherein said metal substrate in the combination (A) is a stainless steel substrate.

8. The method according to claim 4, wherein said metal substrate in the combination (A) is a stainless steel substrate.

9. The method according to claim 2, wherein said synthetic resin substrate in the combination (B) is a synthetic resin substrate having polyethylene terephthalate as a main component.

10. The method according to claim 4, wherein said synthetic resin substrate in the combination (B) is a synthetic resin substrate having polyethylene terephthalate as a main component.

* * * * *